Figure 1:
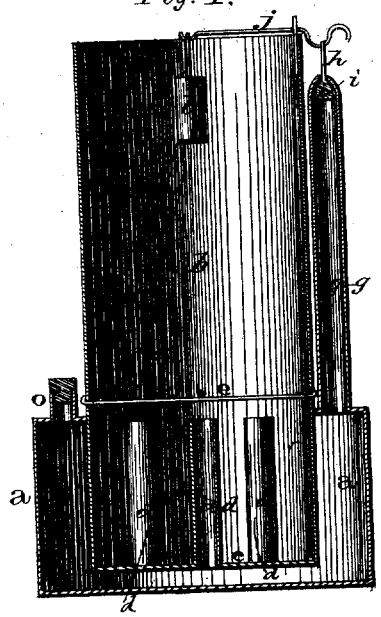
Figure 2:
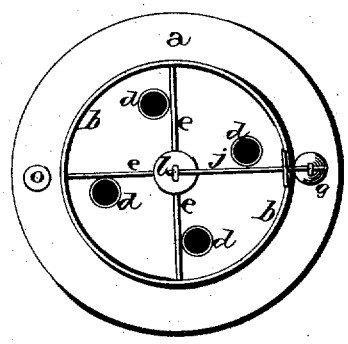

E. A. OSBORNE.

Wash-Boilers.

No. 6,168. Reissued Dec. 8, 1874.

WITNESSES

J. Wm. Larner,

Frank Claudy

INVENTOR.

E. A. Osborne per

F. A. Lehmann, Atty.

THE GRAPHIC CO. PHOTO-LITH. 39 & 41 PARK PLACE, N.Y.

UNITED STATES PATENT OFFICE.

EDWIN A. OSBORNE, OF CHARLOTTE, NORTH CAROLINA.

IMPROVEMENT IN WASH-BOILERS.

Specification forming part of Letters Patent No. 153,495, dated July 28, 1874; reissue No. 6,168, dated December 8, 1874; application filed September 25, 1874.

*To all whom it may concern:*

Be it known that I, EDWIN A. OSBORNE, of Charlotte, in the county of Mecklenburg and State of North Carolina, have invented certain new and useful Improvements in Wash-Boilers; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The nature of my invention relates to an improvement in wash-boilers; and it consists in, first, the combination of two vessels of unequal size. The smaller one, which is for holding the clothes, has its lower end inserted through the closed top of the other, down near its bottom below the level of the water, which serves as a reservoir for the water and steam. The pressure of the steam in the reservoir forces the water up through the clothes until the steam escapes, when, with a properly-regulated heat, the water again flows back into the reservoir, to be again forced out, as before. Second, the arrangements and combination of parts, which will be more fully described hereafter.

The accompanying drawing represents my invention.

*a* represents an ordinary boiler of any desired shape or size, which is closed at its top. Inserted in the boiler, so as to extend down near its bottom, and some distance above its top, is the vessel *b*, which corresponds in shape to the boiler, and in which the clothes are placed to be cleansed. In order to firmly brace this vessel in its position its lower end is fastened to the bottom of the boiler by means of straps or braces of any suitable kind. In the lower end of the vessel *b* is placed a bottom, *c*, from which there extends up one or any greater number of tubes, *d*, through which the water is forced by the steam from the boiling water in the boiler, and through which, also, the steam is forced as the water is displaced, and both water and steam are forced up through the clothes, which are placed on the grating or bars *e*, just above the tubes. Extending upward from the top of the boiler *a* to near the top of the vessel *b*, is a steam-tube, *g*, in the upper end of which is placed a valve, *i*, which is connected by the rod *h* to the short end of the lever *j*, and which is held pressed upward against its seat by the weight *l* and the pressure of the steam from below. It has, however, appeared, from practice, that this tube and valve may be entirely dispensed with, and the two vessels, *a* and *b*, used alone, by a proper regulation of the heat, which, by being kept at a moderate temperature, will cause the machine to act automatically, or if the heat is raised to a great degree, the steam and water are kept constantly passing upward through the clothes with great force, until they are cleansed by this direct and combined action of water and steam. The boiler *a* is supplied with water through the opening *o*, or any other suitable source, and the clothes are then placed in the vessel *b* upon the rack or bars *e*, under the weight *l*. The pipes *d* extend up to about the top of the vessel *a*. As the water becomes heated the steam accumulates in the space between the walls of the vessel *b* and the boiler *a*, and is kept there, owing to the small space through which it has to escape under the lower end of the vessel *b*, and also by the obstruction caused by the water and clothes in the vessel *b*, until its accumulated force becomes so great that it forces the water up through the clothes, and then escapes. As the water can only escape from and return to the vessel *a* through the lower end of vessel *b*, it is constantly being forced upward through the clothes, and then gravitates downward again instead of being made to circulate round and round through the clothes, as heretofore. The hot water and steam passing up through the clothes expand and dissolve the dirt or any foreign substance in them, and, if a great degree of heat is applied, and the steam pipe and valve dispensed with, the constant passage of steam and water from below will effectually cleanse them; but if the steam-pipe and valve are used with a great degree of heat, and when the water is all forced back, the cooling effect of the atmosphere, by contracting the particles of matter in the clothes, aids in cleansing them. The same effect is produced by the automatic action of the machine without the pipe and valve, when a moderate heat is applied.

If so preferred, the false bottom *c* and tubes *d* may be entirely dispensed with, and there be simply a grating, *e*, placed at a suitable point in the vessel for the clothes to rest on.

I am aware that a cooking-utensil, composed of two vessels, one of which has a perforated bottom, and is inserted down through the top of the other, so that the food placed therein is cooked by the action of steam, is not new. I am also aware that a wash-boiler, composed of two vessels, one of which, provided with a perforated bottom placed some distance above its lower edge, is placed loosely in the other, is not new, and these I disclaim.

Having thus described my invention, I claim—

1. In a wash-boiler, the combination of the two vessels *a b*, secured rigidly together, the one, *b*, being provided with a grating, *e*, to support the clothes, and having its lower end passed down through the top of the one, *a*, below the level of the water, whereby a steam-chamber is formed above the lower end of the vessel *b*, so that the pressure of the steam will force the water up through the clothes, and then the water gravitate back into the vessel *a* again, substantially as shown and described.

2. The combination of the boiler *a*, vessel *b*, steam-tube *g*, valve *i*, lever *j*, weight *l*, and a grating, *e*, to support the clothes, substantially as shown.

3. The combination of the boiler *a*, vessel *b*, steam-tube *g*, valve *i*, lever *j*, weight *l*, and false bottom *c d*, substantially as specified.

In testimony that I claim the foregoing I have hereunto set my hand this 22d day of September, 1874.

EDWIN A. OSBORNE.

Witnesses:
A. H. MARTIN,
J. N. CALDWELL.